United States Patent [19]
Woodside

[11] Patent Number: 6,152,472
[45] Date of Patent: Nov. 28, 2000

[54] STABILITY MAINTAINING AND SHOCK ABSORBING FRONT FORK ASSEMBLY FOR BICYCLES

[75] Inventor: Terence D. Woodside, Toronto, Canada

[73] Assignee: Engineered Progression Inc., Vaughan, Canada

[21] Appl. No.: 09/150,237

[22] Filed: Sep. 10, 1998

Related U.S. Application Data

[63] Continuation-in-part of application No. 08/723,133, Sep. 30, 1996, Pat. No. 5,899,478.

[51] Int. Cl.$^7$ .................................................... B62K 25/22
[52] U.S. Cl. ............................................ 280/277; 280/276
[58] Field of Search .................................... 280/276, 277, 280/286, 279; 180/219

[56] References Cited

U.S. PATENT DOCUMENTS

| | | |
|---|---|---|
| 3,954,284 | 5/1976 | Phillips et al. . |
| 4,180,280 | 12/1979 | Doveri .................................... 280/277 |
| 4,410,196 | 10/1983 | Ribi ........................................ 280/276 |
| 5,413,368 | 5/1995 | Pong et al. . |
| 5,427,208 | 6/1995 | Motobu et al. . |
| 5,429,380 | 7/1995 | Lawwill . |
| 5,431,426 | 7/1995 | Ijams et al. . |
| 5,445,401 | 8/1995 | Bradbury . |
| 5,449,155 | 9/1995 | Mack . |
| 5,456,480 | 10/1995 | Turner et al. . |
| 5,462,302 | 10/1995 | Leitner . |
| 5,599,034 | 2/1997 | Brigden . |
| 5,749,590 | 5/1998 | Roerig . |

FOREIGN PATENT DOCUMENTS

| | | |
|---|---|---|
| 2494208 | 11/1980 | France . |
| 3833880 | 10/1988 | Germany . |
| 1540824 | 2/1979 | United Kingdom ................... 280/277 |

*Primary Examiner*—Anne Marie Boehler
*Attorney, Agent, or Firm*—Marks & Clerk

[57] ABSTRACT

A stability maintaining and shock absorbing bicycle front fork assembly comprises a steering spindle for pivotal mounting on a bicycle front frame. A single arm fork member having top and bottom ends is rigidly attached adjacent its top end to tope and bottom crown members rigidly attached to the steering spindle. A swing arm assembly is mounted on the single arm fork member to define a swing arm pivot axis oriented generally parallel to the displaceable axis of rotation, for pivotal movement of the swing arm assembly between a forward position, at which the swing arm assembly extends downwardly and rearwardly from the swing arm pivot axis and wherein the displaceable axis of rotation is disposed forwardly of the steering axis and rearwardly of the swing arm pivot axis, and a trailing position at which the displaceable axis of rotation is disposed closer to the steering axis than when in the forward position. A hub defining the displaceable axis of rotation is disposed on the swing arm assembly so as to permit mounting of a front bicycle wheel thereon. A pivotally jointed linkage arm assembly is pivotally mounted at its ends to the single arm fork member and to the swing arm assembly, respectively, and includes a lower linkage arm and an upper shock linkage arm assembly pivotally connected one to the other. A shock absorber is operatively mounted between the single arm fork member and the upper shock linkage arm assembly, to bias the swing arm assembly to its forward position.

24 Claims, 7 Drawing Sheets

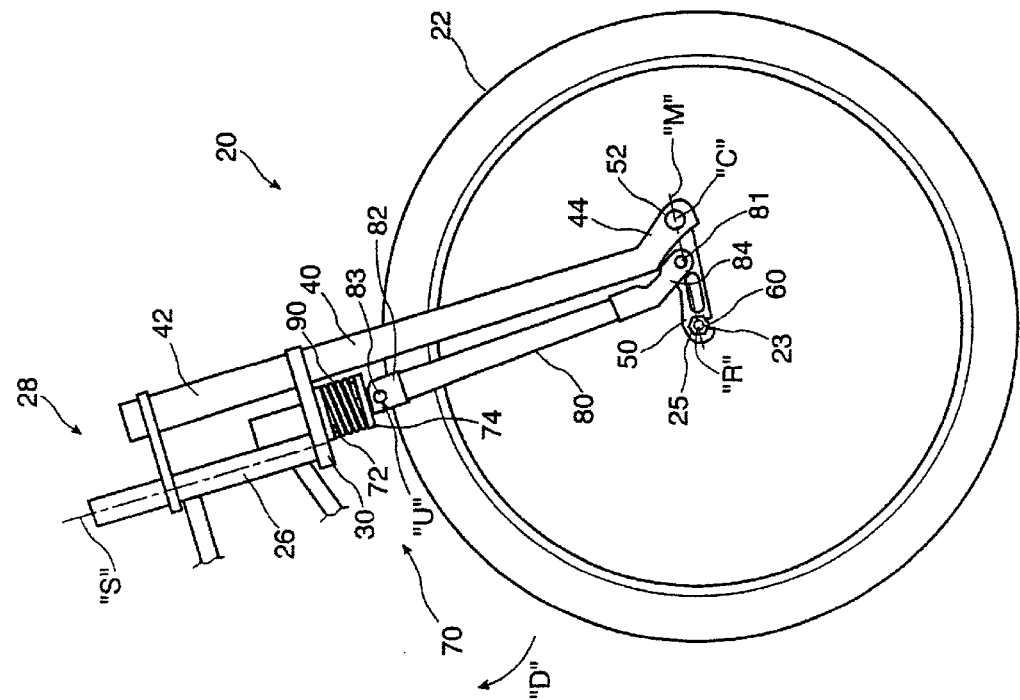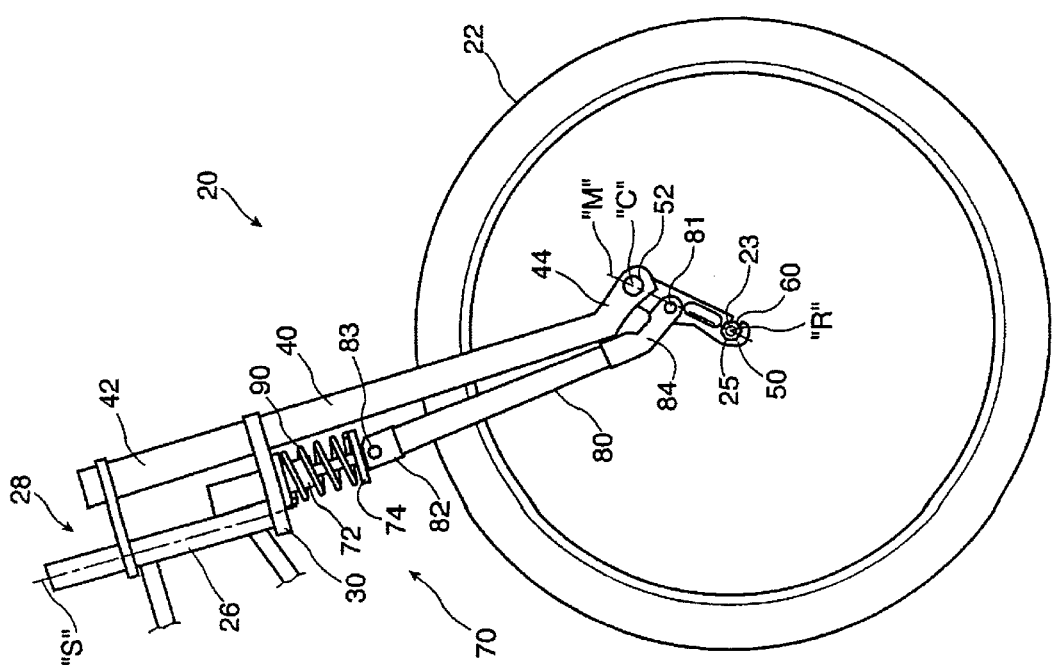

STABILITY MAINTAINING AND SHOCK ABSORBING FRONT FORK ASSEMBLY FOR BICYCLES

CROSS-REFERENCE

This application is a Continuation-In-Part of application Ser. No. 08/723,133 filed Sep. 30, 1996, now U.S. Pat. No. 5,899,478 issued May 4, 1999.

FIELD OF THE INVENTION

This invention relates to bicycle suspension systems and more particularly to a shock absorbing bicycle front fork assembly for mounting a front wheel on an otherwise conventional bicycle.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which presently preferred embodiments of the invention will be illustrated hereafter, by way of example. It is expressly understood, however, that the drawings are for the purpose of illustration and description only and are not intended as a definition of the limits of the invention. Embodiments of this invention will be described hereafter by way of example in association with the accompanying drawings in which:

FIG. 4A is a side elevational view of a first embodiment of a stability maintaining shock absorbing bicycle front fork and trailing arm assembly in keeping with the present invention, in a normally extended configuration;

FIG. 4B is a side elevational view similar to FIG. 4A, with the front fork and trailing arm assembly in a compressed configuration;

BACKGROUND OF THE INVENTION

Bicycles have been known in the world for well over one hundred years. The basic form and resulting function of bicycles were established very early in the development of the bicycle—that is to say that even most very early bicycles comprised a frame, a non-steerable rear wheel powered by a crank arm type pedal linked to the rear wheel through a chain and sprocket assembly, and a steerable front wheel assembly including a front wheel rotatably mounted on a pair of left and right front forks. The front forks are joined together at a hub connected to the steering spindle. The steering spindle is pivotally mounted in a front frame portion for pivotal movement about a steering axis. The steerable front wheel assembly is controllable by means of a manually manipulable hand grips. This fundamental form and function is still found in virtually all conventional bicycles.

Figure 1:
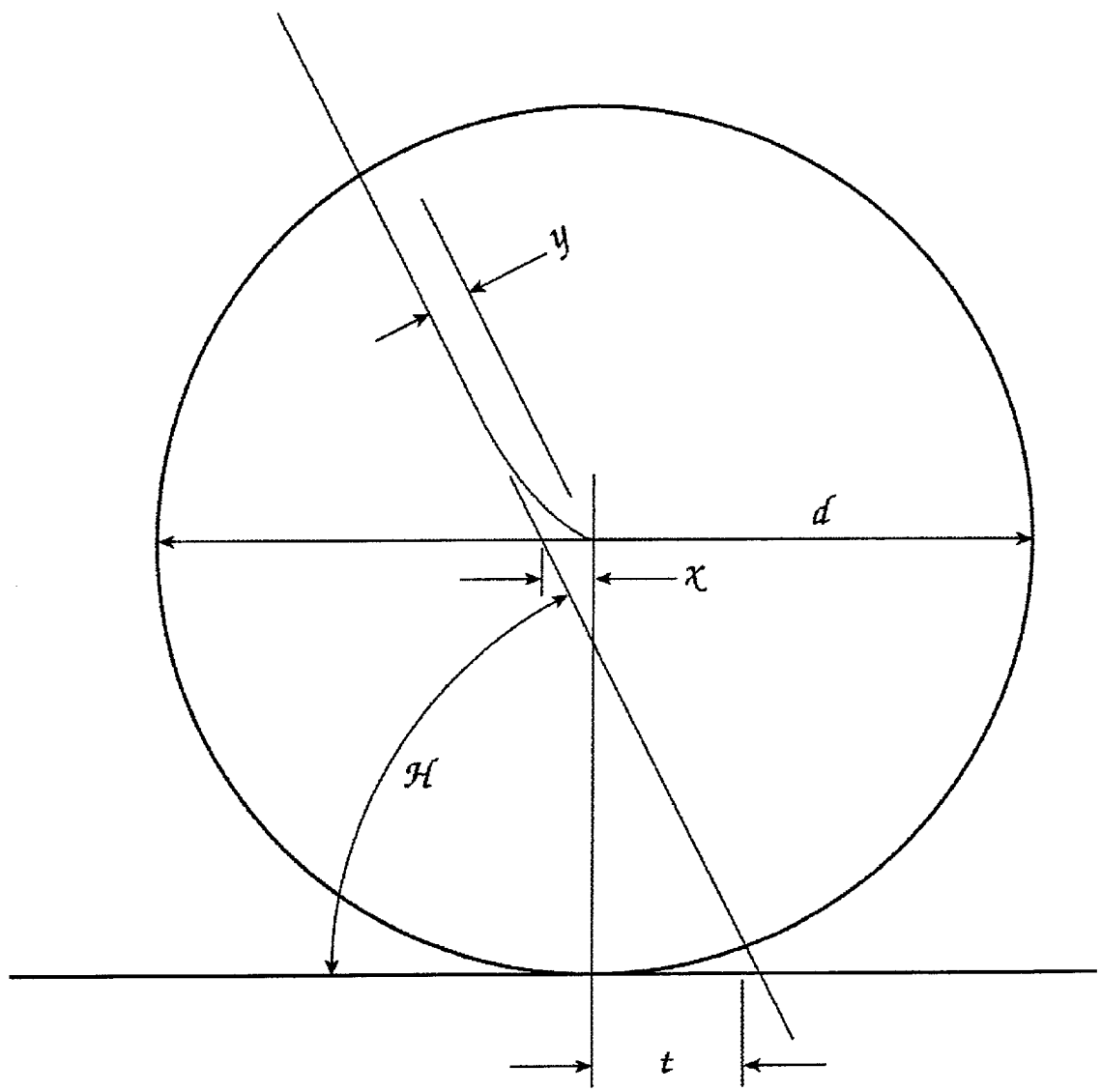
FIG. 1 is a simplified pictorial representation of conventional bicycle front forks with a bicycle wheel mounted thereon, and showing various geometrical measurements.
Figure 2:
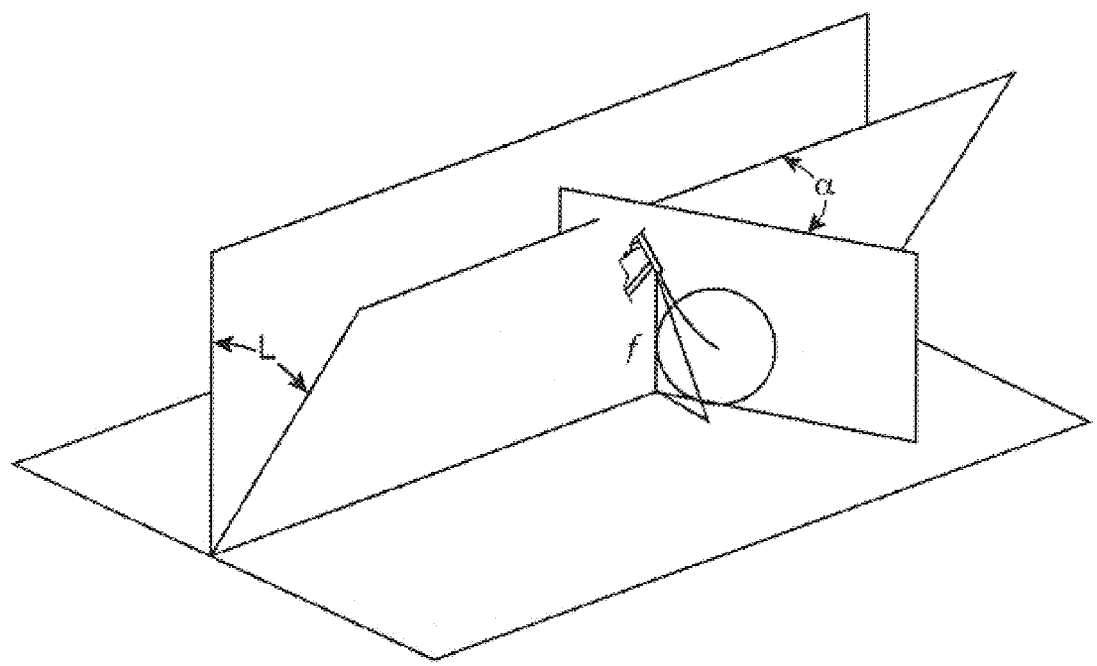
FIG. 2 is a simplified pictorial representation of a front portion of a conventional bicycle frame and front forks, with a bicycle wheel mounted thereon, and showing the geometry involved therewith during turning of the front forks and wheel.

One feature that was included even on very early conventional bicycles is that of forward curvature of the front forks, which forward curvature causes the front forks to extend forwardly at their bottom ends to terminate at a point ahead of the steering axis of the bicycle. The reason for such forward extension of the front forks is to provide a front fork offset y, as can be seen in FIG. 1. The front fork offset y is defined as the perpendicular distance between the steering axis and the axis of rotation of the front wheel. The purpose of the front fork offset is to provide stability to the steering of a bicycle. The stability of the bicycle is, in essence, the measure of the tendency of the bicycle to remain controllable, and therefore rideable, during steering manoeuvres. It is generally accepted that stability may be expressed by the following relation:

$$\mu \equiv \left(\frac{\partial^2 [f/d]}{\partial \alpha \partial L}\right)_{\alpha=0}$$

wherein $f$ is the frame height, d is the diameter of the front wheel (thereby making $f/d$ the relative frame height), $\alpha$ is the steering angle—or, in other words, the angle between the plane of the frame of the bicycle and the plane of the front wheel—, and L is the lean angle—or, in other words, the angle between the plane of the frame and a vertical plane. Empirical evidence indicates that using this relation, bicycles tend to have good steering characteristics when $\mu$ is between −1 and −3. It can be seen in FIG. 2, that the lean angle L is affected by the front fork offset. Therefore, the stability is affected by the front fork offset.

Figure 3:
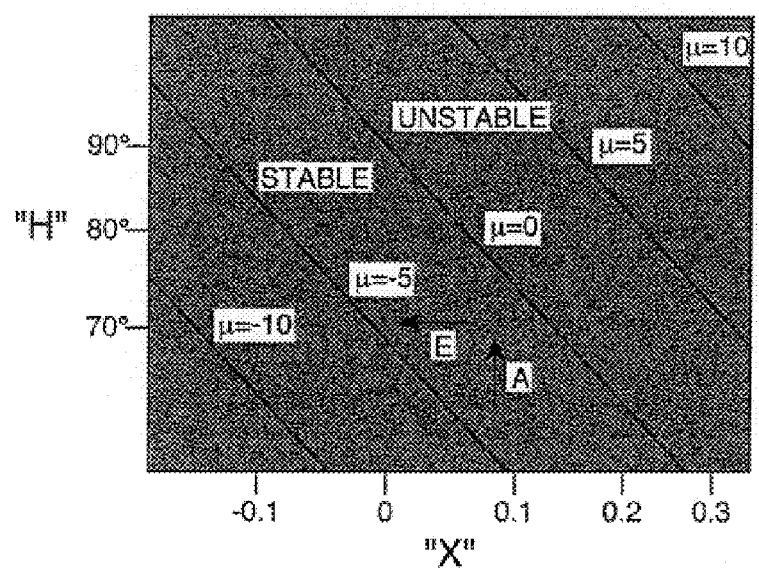
FIG. 3 is a graph of the relative front projection versus the head angle of various bicycles.

The concept of stability of a bicycle can perhaps be more readily understood as expressed graphically in FIG. 3, which relates the stability value $\mu$ to the relative front projection x of the axis of rotation of the front wheel as compared to the steering axis and the head angle. The stability value $\mu$ is indicated for a variety of bicycles. The relative front projection x of the axis of rotation of the front wheel is defined as the horizontal distance between the axis of rotation of the front wheel and the point at which the steering axis intersects a horizontal line passing therethrough, divided by the diameter of the front wheel, as can be seen in FIG. 1. As can be seen from FIG. 3, most bicycles have a relative front projection x in the order of +0.1 and a stability value $\mu$ between about −1 and −3. As can be discerned through FIGS. 1 and 3, the relative front projection is related to the front fork offset y and the head angle H, with the head angle is the angle between the ground and the steering axis. The head angle H and the relative front projection x therefore also affect the stability of a bicycle, since they are related to the front fork offset.

It would therefore seem reasonable that, in order to provide an extremely safe bicycle, it would merely be a matter of increasing the stability of a bicycle such that the stability value $\mu$ is between about perhaps −5 and −10. Such increase in stability could be accomplished simply by decreasing the front fork offset, and therefore the relative front projection, and/or decreasing the head angle; however, it has been found that it is necessary to have a relative front projection in the order of 0.05 to 0.10 and a head angle from about 72° to about 75° in order to provide suitable handling characteristics for a bicycle. In other words, in order to have reasonable stability and acceptable handling characteristics, the relative front projection and the head angle must fall within a certain range. Any variation of the front relative projection or head angle outside the above stated values will compromise either the stability or the handling characteristics of a bicycle. Most conventional bicycles are fixed in terms of their head angle, relative front projection, and so on. Accordingly, their handling characteristics and stability are predetermined. Some bicycles, however, such as more elaborate mountain bicycles, have shock absorbing front fork assemblies wherein the effective length of the front fork assembly necessarily changes. For instance, when the front wheel of a bicycle having a shock absorbing front fork assembly is raised off the ground and subsequently impacts back on the ground, the front portion of the frame continues to move downwardly with respect to the front wheel for a few centimeters. Accordingly, the effective height of the frame decreases temporarily; and accordingly there will be a temporary decrease in the stability of the bicycle.

As can be seen from FIGS. 4A and 4B, when the frame height of a bicycle is decreased, that the head angle also increases. As can be seen in FIG. 3, as indicated by arrow A. when the head angle is increased, the stability is decreased. It has been found that, in mountain bicycles having a front fork assembly with about five to seven and one half centimeters (two to three inches) of travel, the maximum change of head angle affects the stability of the bicycle only a minor amount; however, in mountain bicycles having a front fork assembly with about fifteen centimeters (six inches) of travel, the maximum change in head angle significantly affects the stability of the bicycle. Such significant decrease in stability is potentially dangerous and must be compensated for. In order to maintain stability during full travel of a fork assembly with about fifteen centimeters (six inches) of travel, it is possible to counteract the increase in head angle by correspondingly decreasing the relative front projection —or in other words the front fork offset—of the axis of rotation of the front wheel.

It is therefore an object of the present invention to provide a stability maintaining shock absorbing bicycle front fork and trailing arm assembly for mounting a front wheel on a conventional bicycle, which bicycle front fork and trailing arm assembly is configured such that the front fork offset correspondingly decreases with a decrease in the relative frame height of the bicycle due to a corresponding compression of the front forks of the bicycle, thereby maintaining stable steering stable steering of the bicycle at all times.

A further object of the present invention is to provide a stability maintaining shock absorbing bicycle front fork and trailing arm assembly for mounting a front wheel on a conventional bicycle, which bicycle front fork and trailing arm assembly maintains stable steering stable steering of the bicycle at all times, even for compression of the front fork assembly of up to fifteen centimeters (six inches), or greater.

DESCRIPTION OF THE PRIOR ART

The following prior art references are known to the inventor:

U.S. Pat. No. 3,954,284
U.S. Pat. No. 5,413,368
U.S. Pat. No. 5,427,208
U.S. Pat. No. 5,429,380
U.S. Pat. No. 5,431,426
U.S. Pat. No. 5,445,401
U.S. Pat. No. 5,449,155
U.S. Pat. No. 5,456,480
U.S. Pat. No. 5,462,302
U.S. Pat. No. 5,599,034
U.S. Pat. No. 5,749,590
French Patent No. 2,494,208
German Patent No. 3,833,880

These prior art patents disclose various kinds of suspension systems, fork assemblies, and the like. It is not known in the prior art to accommodate a compression of about fifteen centimeters (six inches) of a fork assembly while compensating for the change in stability that follows such compression of the front forks in prior art devices.

SUMMARY OF THE INVENTION

In accordance with one aspect of the present invention, there is provided a stability maintaining and shock absorbing bicycle front fork assembly for mounting a front bicycle wheel on a bicycle, for rotation of the front bicycle wheel about a displaceable axis of rotation. The front fork assembly includes a steering spindle for pivotal mounting on a front frame portion of a bicycle. The steering spindle defines a steering axis longitudinally thereof. A top crown member and a bottom crown member are each rigidly attached to the steering spindle for pivotal movement therewith. A single arm fork member having a top end and a bottom end is rigidly attached adjacent its top end to the top and bottom drown members so as to depend therefrom. A swing arm assembly is pivotally mounted on a the single arm fork member, for pivotal movement of the swing arm assembly about a swing arm pivot axis oriented generally parallel to the displaceable axis of rotation of the front bicycle wheel and generally perpendicular to the steering axis, and disposed forwardly of the steering axis. A hub means defines the displaceable axis of rotation for a front bicycle wheel, and is disposed on the swing arm assembly so as to permit mounting of a front bicycle wheel thereon, whereby the front bicycle wheel can rotate about the displaceable axis of rotation. When a front bicycle wheel is mounted on the hub means, the swing arm assembly is pivotally moveable between a forward position whereat the displaceable axis of rotation is disposed forwardly of the steering axis and between the steering axis and the swing arm pivot axis, and a trailing position whereat the displaceable axis of rotation is disposed closer to the steering axis than when in the forward position, and is also displaced vertically closer to the swing arm pivot axis than when in the forward position. A variable length shock absorbing means comprises an upper component and a lower component. The upper and lower components are slidably engaged one with the other for relative movement between an extended configuration and a compressed configuration, with the upper component securely mounted on the single arm fork member. A linkage arm assembly having a top end and a bottom end is pivotally mounted at its bottom end to the swing arm assembly for pivotal movement about linkage arm lower axis, and is pivotally mounted at its top end to the lower component of the shock absorbing means for pivotal movement about a linkage arm upper axis, with the linkage arm upper and lower axes being substantially parallel to the displaceable axis of rotation. The linkage arm assembly comprises a lower linkage arm and a upper shock linkage arm assembly pivotally mounted one to the other. The lower linkage arm includes the bottom end of the linkage arm assembly, and the upper shock linkage arm assembly has a first end and a second end. The upper shock linkage arm assembly is pivotally mounted at the first end to the lower linkage arm, and is pivotally mounted at the second end to the single arm fork member, and includes the top end of the linkage arm assembly. The variable length shock absorbing means is spring biased to its extended configuration so as to bias the swing arm assembly to its forward position.

In accordance with another functional analysis of the present invention, there is provided a stability maintaining and shock absorbing bicycle front fork assembly for mounting a front bicycle wheel on a bicycle for rotation of the front bicycle wheel about a displaceable axis of rotation. The front fork assembly includes a steering spindle for pivotal mounting on a front frame portion of a bicycle. The steering spindle defines a steering axis longitudinally thereof. A top crown member and a bottom crown member are each rigidly attached to the steering spindle for pivotal movement therewith. A single arm fork member having a top end a bottom end is rigidly attached adjacent its top end to the top and bottom crown members so as to depend therefrom. A swing arm assembly is mounted on the single arm fork member to define a swing arm pivot axis oriented generally parallel to the displaceable axis of rotation, for pivotal movement of the swing arm assembly between a forward position, whereat the swing arm assembly extends downwardly and rearwardly from the swing arm pivot axis and wherein the displaceable axis of rotation is disposed forwardly of the steering axis and rearwardly of the swing arm pivot axis, and a trailing position whereat the displaceable axis of rotation is disposed closer to the steering axis than when in the forward position. A hub means defines the displaceable axis of rotation for a front bicycle wheel, and is disposed on the swing arm assembly so as to permit mounting of a front bicycle wheel thereon, whereby the front bicycle wheel can rotate about the displaceable axis of rotation. A pivotally jointed linkage arm assembly has a top end pivotally mounted to the single arm fork member for pivotal movement about a linkage arm upper axis and a bottom end pivotally mounted to the swing arm assembly for pivotal movement about a linkage arm lower axis, and includes a lower linkage arm and an upper shock linkage arm assembly pivotally connected one to the other. A spring and damper shock absorbing means is operatively mounted between the single arm fork member and the upper shock linkage arm assembly so as to bias the swing arm assembly to its forward position.

DETAILED DESCRIPTION OF THE PREFERRED EMBODIMENTS

Reference will now be made to FIGS. 4 through 8, in which first and second preferred embodiments of the stability maintaining shock absorbing bicycle front fork and trailing arm assembly of the present invention, are discussed.

Reference is first made to FIGS. 4A and 4B, where a first preferred embodiment of the stability maintaining shock absorbing bicycle front fork and trailing arm assembly 20 is shown. This first preferred embodiment, and an alternative embodiment thereof, are discussed and claimed specifically in Applicant's copending application Ser. No. 08/723,133, noted above. The immediately following discussion, while specifically directed to the embodiment shown in FIGS. 4A and 4B, also explains the principles of the present invention, and is important to note for those principles.

The front fork and trailing arm assembly 20 is arranged for mounting a front bicycle wheel 22 on a conventional bicycle. The front wheel 22 rotates about a displaceable axis of rotation R. The bicycle has a steering spindle 26 pivotally mounted in a front frame portion 28 thereof, for pivotal movement of the steering spindle 26 about a steering axis S.

The variable length shock absorbing bicycle front fork assembly 20 comprises a hub member 30 rigidly attached to the steering spindle 26, such as by means of welding, or other suitable means, for concurrent pivotal movement of the hub member 30 with the steering spindle 26. Opposed left and right fork members 40 each having a top end 42 and a bottom end 44, and being rigidly attached adjacent their top ends 42 to the hub member 30 so as to depend therefrom, are each rigidly attached to the hub member 30, such as by means of welding. Alternatively they may be integrally formed one with the other, or by any other suitable conventional fastening means. As shown, the left and right fork members 40 are substantially identical one to the other. Accordingly, these and other components that are duplicated one on each side of the front bicycle wheel 22, are each indicated by a single reference numeral, for the sake of clarity.

When the steering spindle 26 is turned by the handle bars (not shown) of the bicycle, the hub member 30, the left and right fork members 40, and ultimately the front bicycle wheel 22 rotate therewith so as to permit steering of the bicycle.

Left and right trailing arms 50 are pivotally mounted with one trailing arm 50 on each of the left and right fork members 40, respectively, by means of conventional bolts 52 and co-operating nuts (not shown), or by any other suitable mounting means for pivotal movement of each trailing arm 50 about a common pivot axis C. Each of the left and right trailing arms 50 is about 10 cm to 15 cm long, with the distance along the trailing arms 50 from the common pivot axis C to the displaceable axis of rotation R being between about 5 cm and 15 cm—typically, about 10 to 15 cm—and preferably about 12 cm. The common pivot axis C is oriented generally parallel to the displaceable axis of rotation R of the front bicycle wheel 22, and also oriented generally perpendicularly to the steering axis S. The common pivot axis C is also disposed forwardly of the steering axis S, so that the left and right trailing arms 50 can rotate rearwardly toward the steering axis S, as will be discussed in greater detail hereafter.

A bicycle wheel mounting means comprising a pair of mounting sockets 60 disposed one on each of the left and right trailing arms 50, permits mounting of the front bicycle wheel 22 on the left and right trailing arms 50 by means of an axle 23 and co-operating nuts 25. Typically, an oversize axle is employed. The front bicycle wheel 22 is mounted on the left and right trailing arms 50 such that the front bicycle wheel 22 rotates about the displaceable axis of rotation R. It can be seen that the displaceable axis of rotation R moves as the left and right trailing arms 50 pivot about their common pivot axis C. When the front wheel 22 is mounted on the left and right trailing arms 50, the left and right trailing arms 50 are concurrently pivotally moveable between a forward position as shown in FIG. 4A, and a trailing position as shown in FIG. 4B. When the left and right trailing arms are in their respective forward positions, the displaceable axis of rotation R of the front bicycle wheel 22 mounted on the front fork and trailing arm assembly 20 is disposed forwardly of the steering axis S by a distance of between about 2 cm to 8 cm, and preferably about 5 cm. Further, the displaceable axis of rotation R of the front bicycle wheel 22 is between the steering axis S and the common pivot axis C, when the left and right trailing arms 50 are in their forward position. When the left and right trailing arms are in their respective trailing positions, the displaceable axis of rotation R of the front bicycle wheel 22 mounted on the front fork and trailing arm assembly 20 is disposed closer to the steering axis S, and preferably very near or even on the steering axis S, than is the case when the left and right trailing arms 50 are in their respective forward positions. The displaceable axis of rotation R is also displaced vertically closer to the common pivot axis when the left and right trailing arms 50 are in their respective trailing positions than when in their respective forward positions.

The left and right trailing arms 50 are disposed along a main axis M, which main axis M extends from, and passes through, the common pivot axis C to the displaceable axis of rotation R. In the preferred embodiment, the main axis M of the left and right trailing arms 50 is disposed at an angle of about 5° with respect the horizontal, when the left and right trailing arms 50 are in their respective trailing positions.

A variable length shock absorbing means 70, comprising an upper component 72 securely attached to the hub member 30 and a lower component 74 depending from the upper component 72. The upper component 72 and the lower component 74 are slidably engaged one with the other for relative movement between an extended configuration, as can be seen in FIG. 4A, and a compressed configuration, as can be seen in FIG. 4B. In the preferred embodiment, the lower component 74 of the variable length shock absorbing means 70 can travel with respect to the upper component 72 by a distance of slightly greater than 15 cm, as dictated by the necessity of a suspension system of a bicycle, such as a mountain bicycle, to absorb severe impact during riding. The variable length shock absorbing means 70 further comprises a fluidic damper 76 operatively disposed between the upper component 72 and the lower component 74, so as to provide a physical resistance to the relative movement of the upper component 72 and the lower component 74 between their extended configuration and their compressed configuration.

A linkage arm 80 having a top end 82 and a bottom end 84, is pivotally mounted at its bottom end 84 to a selected one of the left and right trailing arms 50 by conventional mounting means such as a bolt 81 extending through apertures (not shown) in the selected one of the left and right trailing arms 50 and the linkage arm 80, retained therein by a co-operating nut (not shown). The linkage arm 80 is thereby pivotally mounted for pivotal movement about a linkage arm lower axis B, as the left and right trailing arms 50 pivot about their common pivot axis C. Preferably, the aperture disposed on the selected one of the left and right trailing arms 50, and therefore the linkage arm lower axis B, is positioned between the common pivot axis C and the displaceable axis of rotation R.

The linkage arm 80 is also pivotally mounted at its top end 82 to the lower component 74 of the variable length shock absorbing means 70 for pivotal movement about a linkage arm upper axis U, with such pivotal movement occurring when the left and right trailing arms 50 pivot about their common pivot axis C. It can be seen in FIGS. 4A and 4B that the linkage arm upper axis U and the linkage arm lower axis B are substantially parallel to the displaceable axis of rotation R. Such pivotal mounting of the linkage arm 80 at its top end 82 to the lower component 74 of the variable length shock absorbing means 70 and at its bottom end 84 to the selected one of the left and right trailing arms 50, permits the necessary angular movement of the linkage arm 80 with respect to the variable length shock absorbing means 70, so as to accommodate the pivotal movement of the left and right trailing arms 50 when the front bicycle wheel 22 is forced upwardly during riding of the bicycle 24. Such angular movement of the linkage arm 80 permits the necessary travel of 15 cm, or even more, of the lower component 74 with respect to the upper component 72, as required to absorb large bumps, as will be discussed in greater detail hereafter.

A spring biasing means 90 in the form of a coil spring is mounted between the upper component 72 and the lower component 74 of the variable length shock absorbing means 70, so as to bias the variable length shock absorbing means 70 to its extended configuration, and thereby also bias the left and right trailing arms 50 to their respective forward positions.

In use, it is necessary that the suspension of the bicycle, especially the stability maintaining shock absorbing bicycle front fork and trailing arm assembly 20, permit vertical travel of the displaceable axis of rotation R of the front bicycle wheel 22, such that the change in vertical distance between the displaceable axis of rotation R and a fixed point on the hub member 30 is decreasable by at least 15 cm, when the left and right trailing arms are pivotally moved from their respective forward positions to their respective trailing positions, as indicated by arrow C, such as when a bump is encountered by the front wheel 22. The left and right trailing arms 50 are pivotally moved from their forward position, as can be seen in FIG. 4A, to their trailing position, as can be seen in FIG. 4B, whereat the displaceable axis of rotation R is near or on the steering axis S. Also, the linkage arm 80 is pivotally moved so as to pivot in a direction indicated by arrow D about the linkage arm upper axis U. Further, the linkage arm 80 pushes upwardly on the lower component 74 of the variable length shock absorbing means 70, which shock absorbing means 70 is forced to its compressed configuration, so as to absorb the impact of the relative upward movement of the front bicycle wheel 22. The head angle H of the steering axis S is correspondingly increased, by a few degrees, when the front bicycle wheel 22 is in the position as shown in FIG. 4B. Accordingly, as can be seen in FIG. 3, at arrow A, the potential stability of the bicycle would decrease. Quite unexpectedly, in order to compensate for this potential decrease in stability, the movement of the left and right trailing arms 50 permits the displaceable axis of rotation R to be near the steering axis S, which decreases the front fork projection x. As can be seen in FIG. 3, at arrow E, decreasing the relative front projection x compensates for the potential loss of stability due to the change in head angle, thereby allowing the bicycle to remain stable. Such pivotal movement of the left and right trailing arms 50 to provide sufficient decrease in the relative front projection x, for large decreases (in the order of 15 cm) in the vertical distance between the displaceable axis of rotation R and a fixed point on the hub member 30 can only be accomplished by means of a linkage arm 80 that pivots at both its bottom end 84 and its top end 82.

Figure 8:
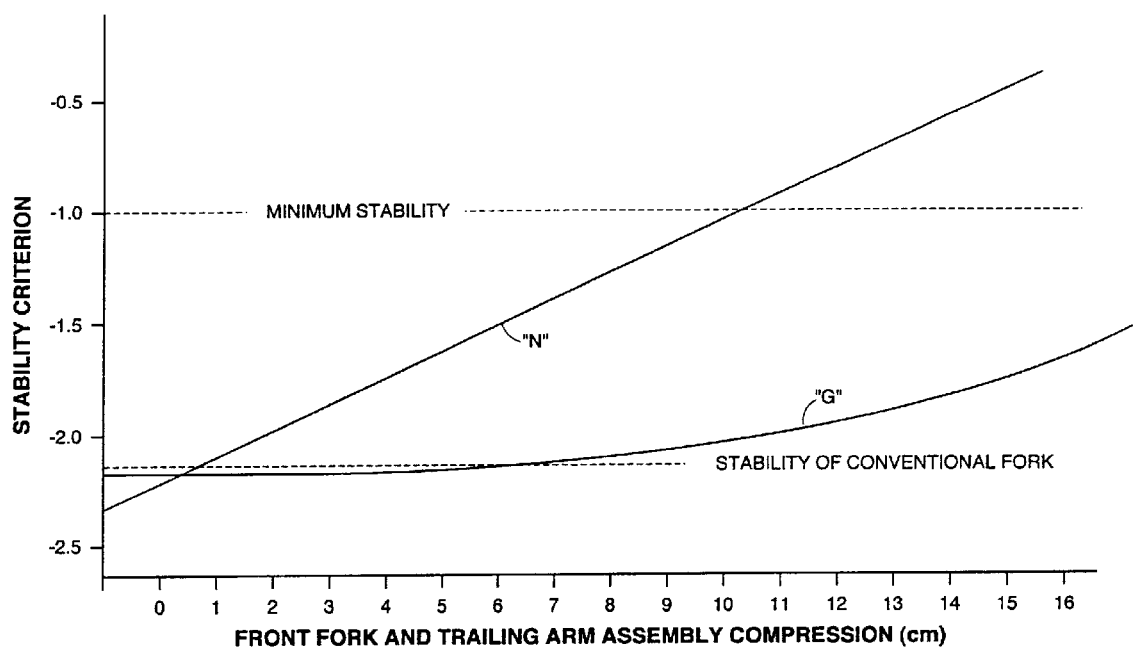
FIG. 8 is a graph comparing the stability curves of both a conventional telescopic front fork assembly and the front fork assembly of the present invention.

The stability of a bicycle having the stability maintaining shock absorbing bicycle front fork and trailing arm assembly 20, is maintained throughout movement of the left and right trailing arms 50 from their respective forward positions to their respective trailing positions, as is shown by curve G in FIG. 8, as compared to a conventional telescopic front fork bicycle, as is shown by curve N in FIG. 8.

Figure 5:
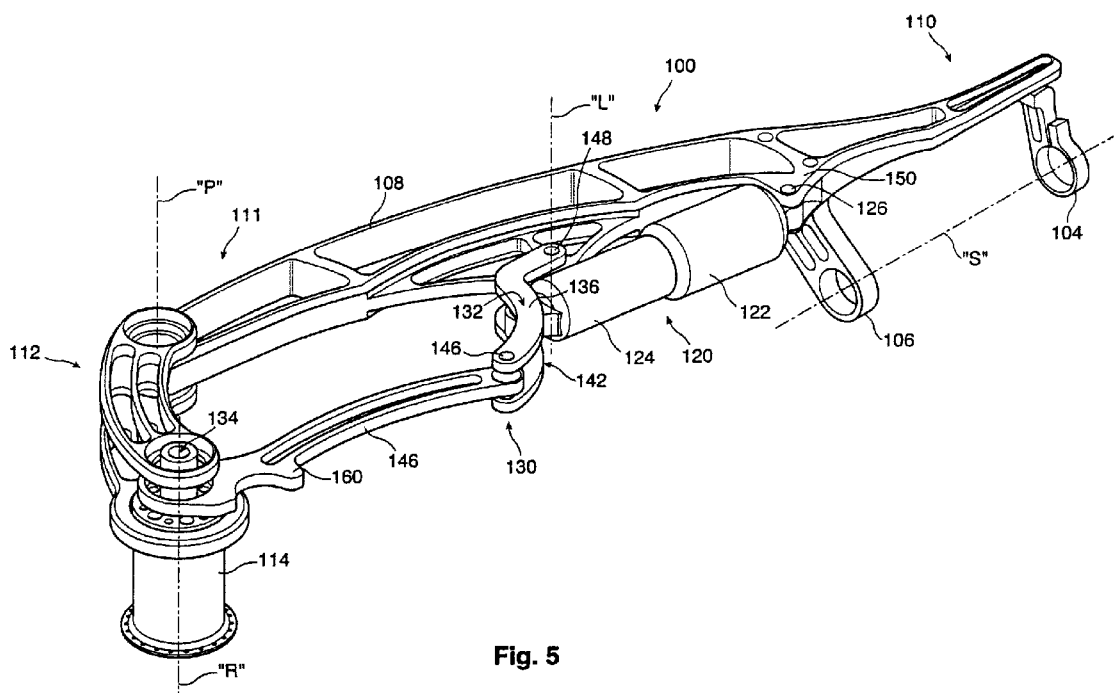
FIG. 5 is a perspective view of a single arm stability maintaining and shock absorbing single arm front fork assembly for bicycles, in keeping with the second preferred embodiment of the present invention.

Turning now to FIGS. 5 through 7, a second preferred embodiment of the present invention is shown. In this particular embodiment, it will first be noted that this second, preferred embodiment comprises a single arm fork member, rather than a more conventional two arm fork member. There are a number of advantages to the utilization of a single arm fork member, particularly for relatively expensive, high performance bicycles. They include the fact that the front wheel of the bicycle can be more easily replaced by being fitted over the hub which forms part of the front fork assembly, without having to disassemble the assembly of a shock absorbing bicycle front fork. Also, a single arm fork member, particularly one which may be configured in the manner shown in the drawings, may be significantly lighter in weight. It should also be noted that, during the subsequent discussion, there is discussion of a steering spindle which comprises one component of the stability maintaining and shock absorbing bicycle front fork assembly of the present invention. It will be understood that the steering spindle might well form part of a conventional bicycle; alternatively, the steering spindle may form a constituent element of the front fork assembly of the present invention and be supplied with it to the purchaser thereof for mounting to the frame of an otherwise conventional bicycle.

The second preferred embodiment of a stability maintaining and shock absorbing bicycle front fork assembly 100 is shown in each of FIGS. 5, 6A, 6B, 7A, and 7B. The purpose of the bicycle front fork assembly is to mount a front bicycle wheel on a bicycle, so that the bicycle wheel will rotate about a displaceable axis of rotation R. As part of the assembly, there is included a steering spindle 102 (not shown in FIG. 5, but seen in FIGS. 6A, 6B, 7A, and 7B), which is arranged for pivotal mounting on a front frame portion of a bicycle. The steering spindle defines a steering axis S longitudinally thereof. A top crown member 104, and a bottom crown member 106, are each rigidly attached to the steering spindle 102 for pivotal movement therewith.

For purposes of maintenance and ease of replacement, the top and bottom crown members 104, 106 are each rigidly attached to the steering spindle 102, but are removable therefrom by loosening appropriate fastening means (not shown), in order that the steering spindle may be replaced.

There is a single arm fork member 108 which has a top end 110 and a bottom end 111. The single arm fork member 108 is rigidly attached at its top end 110 to the top and bottom crown members 104, 106, so as to depend from the crown members. Of course, with the single arm fork member 108 being rigidly attached to the top and bottom crown members 104, 106, which are each in turn rigidly attached to the steering spindle 102, as the spindle 102 rotates about the steering axis S, the single arm fork member 108 will move arcuately about the steering axis S.

The general configuration of the single arm fork member 108 is such that the upper portion 110 and the lower portion 111 unite at a common junction. The lower portion 111 is forwardly bowed in its general configuration. Where the common junction between the upper and lower portions of the single arm fork member occurs, there is a rearwardly directed mounting tab 150.

Mounted at the bottom end 111 of the single arm fork member 108 is a swing arm assembly 112. From an inspection of FIGS. 6A and 6B, in particular, it can be noted that the swing arm assembly can be mounted anywhere along the length of the single arm fork member 108. However, in general, the swing arm assembly 112 is mounted adjacent the bottom end of the single arm fork member 108.

Figures 7A, 7B:
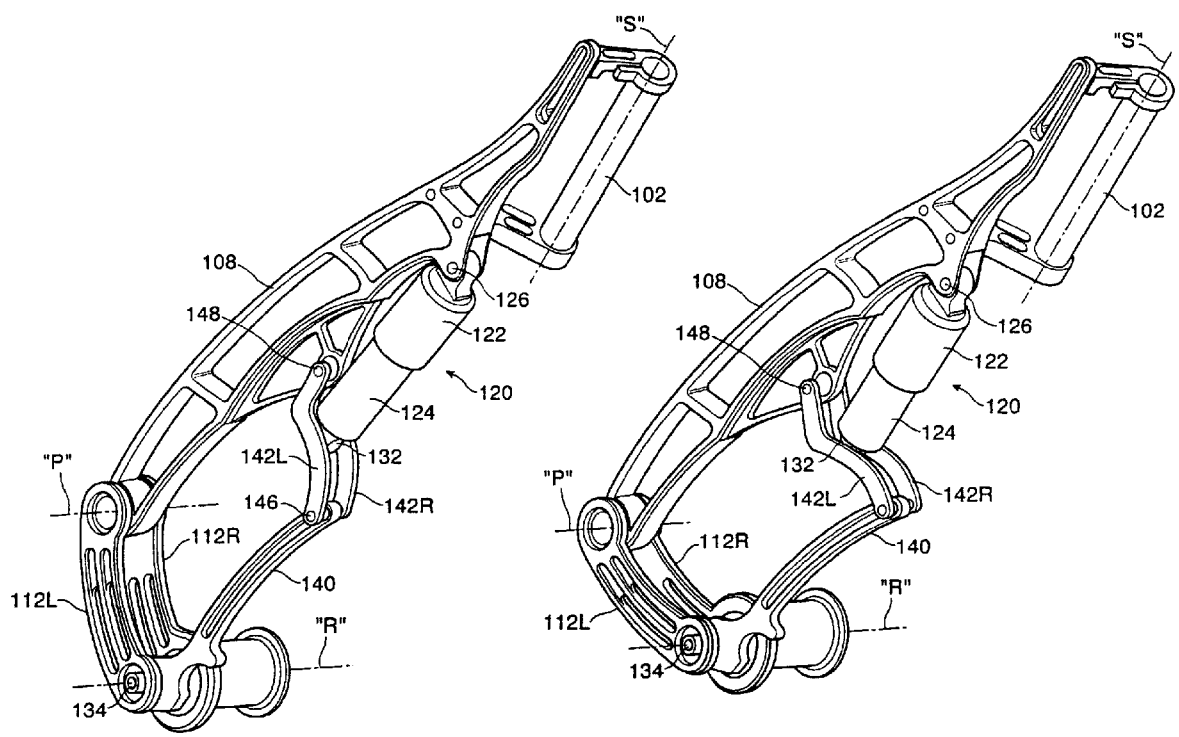
FIG. 7A is a perspective view of the second preferred embodiment of the stability maintaining and shock absorbing single arm bicycle front fork assembly of the present invention, in a normally extended configuration.
FIG. 7B is a perspective view similar to FIG. 7A, with the stability maintaining and shock absorbing single arm assembly in a compressed configuration.

As can best be seen from FIGS. 7A and 7B, the swing arm assembly 112 comprises left and right swing arm members 112L and 112R. The swing arm assembly 112 is mounted for pivotal movement about a swing arm pivot axis P. The swing arm pivot axis P is generally parallel to the displaceable axis of rotation R; and each is generally perpendicular to the steering axis S. Each of the swing arm pivot axis P and the displaceable axis of rotation R is disposed forwardly of the steering axis S.

A hub means 114 is provided for mounting a front bicycle wheel thereon. The hub means 114 defines the displaceable axis of rotation R. Thus, when a front bicycle wheel is mounted on the hub means 114, the wheel will rotate about the displaceable axis of rotation R.

Figure 6A:
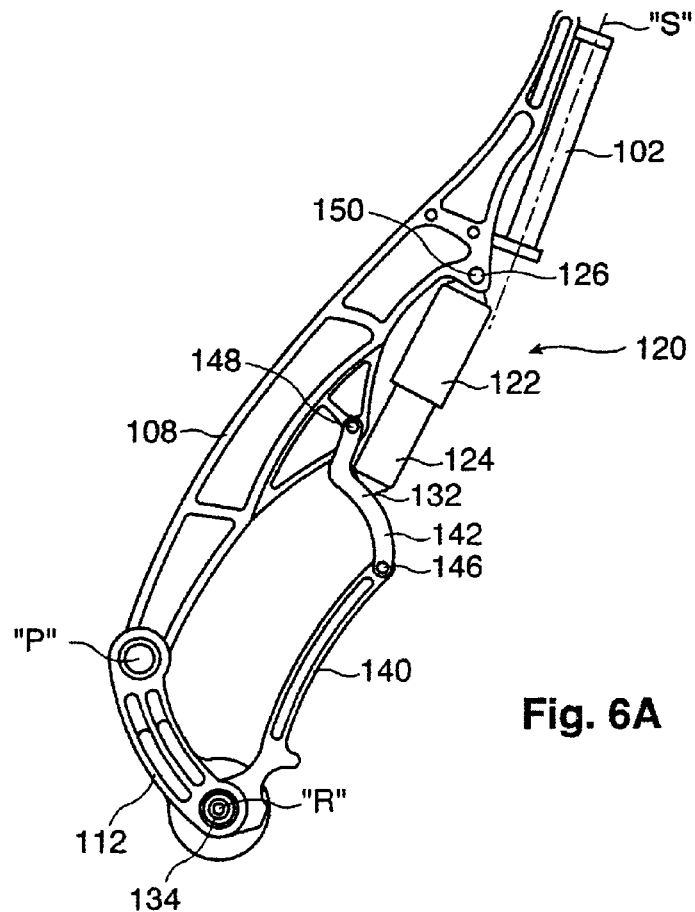
FIG. 6A is a side elevational view of the second preferred embodiment of the stability maintaining and shock absorbing single arm bicycle front fork assembly of the present invention, in a normally extended configuration.
Figure 6B:
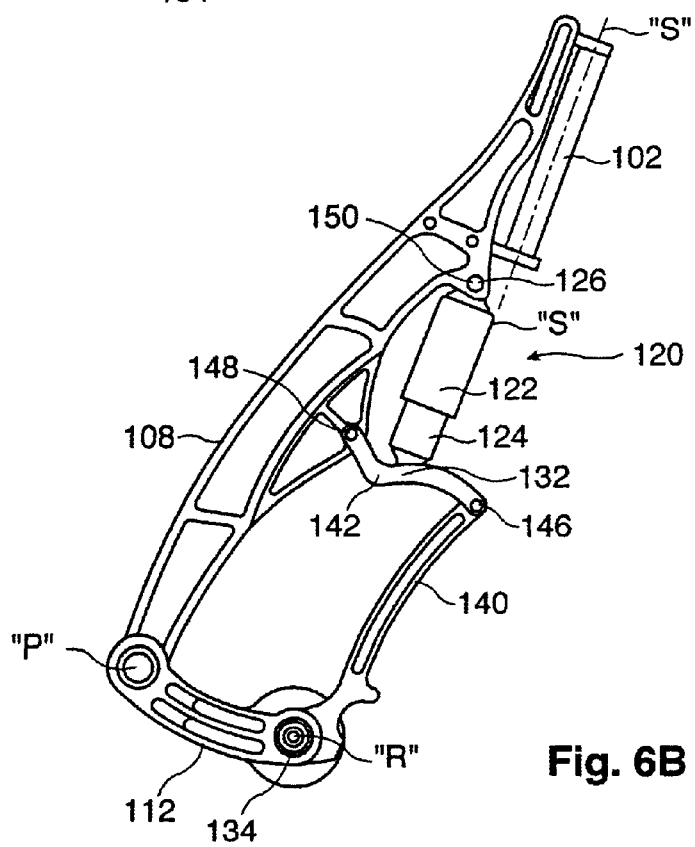
FIG. 6B is a side elevational view similar to FIG. 6A, with the stability maintaining and shock absorbing single arm assembly in a compressed configuration.

Referring particularly to FIGS. 6A and 6B, and also to FIGS. 7A and 7B, it will be noted that when a front bicycle wheel is mounted on the hub 114 so that the bicycle is operational, then the front bicycle wheel and the displaceable axis of rotation R may be expected to move upwardly and downwardly. More specifically, because of the pivotal arrangement of the swing arm assembly 112 to the single arm fork member 108, the swing arm assembly 112 is pivotally moveable between a forward position as shown in FIGS. 6A and 7A, and a trailing position as shown in FIGS. 6B and 7B. It will be best seen from FIGS. 6A and 7A that, in the forward position, the displaceable axis of rotation R is disposed more forwardly of the steering axis S than when the swing arm assembly 112 is in its trailing position. It is also evident from an examination of FIGS. 6A and 6B that the displaceable axis of rotation R is displaced vertically closer to the level of the swing arm pivot axis P when the swing arm assembly 112 is in the trailing position than when it is in its forward position.

A variable length shock absorbing means—typically, a pneumatic or hydraulic shock absorber which is spring biased, as discussed hereafter—is provided, and is shown as shock absorber 120. The shock absorber 120 comprises an upper component 122 and a lower component 124, which are slidably engaged one with the other for relative movement between an extended configuration as shown in FIGS. 5, 6A, and 7A, and a compressed configuration as shown in FIGS. 6B and 7B. The upper component 122 is securely mounted at its upper end, at 126, to the rearwardly directed mounting tab 150 on the single arm fork member 108. The connection between the upper component 122 of the shock absorber 120 and the single arm fork member 108, at 126, permits pivotal motion of the shock absorber 120 with respect to the single arm fork member 108.

There is a linkage arm assembly 130, which has a top end shown at 132 and a bottom end shown at 134. The linkage arm assembly 130 is pivotally mounted at its bottom end 134 to the swing arm assembly 112, for pivotal movement about a linkage arm lower axis. In the preferred embodiment as shown in FIGS. 5 through 7, the linkage arm lower axis is shown as being coincident with the displaceable axis of rotation R, but other configurations may be arranged as well, in order to increase or decrease the moment arm o the shock absorber 120 about the swing arm pivot axis P. The linkage arm assembly 130 is pivotally mounted at its top end 132 to the lower component 124 of the shock absorber 120, for pivotal movement about a linkage arm upper axis L which is substantially parallel to the displaceable axis of rotation R. The linkage arm assembly 130 comprises a lower linkage arm 140 and an upper shock linkage arm assembly 142. As noted particularly in FIGS. 7A and 7B, the upper shock linkage arm assembly 142 comprises a pair of arms 142L and 142R. The lower linkage arm 140 and the upper shock linkage arm assembly 142 are pivotally mounted one to the other at 146. The lower linkage arm 140 includes the bottom end 134 of the linkage arm assembly 130. The upper shock linkage arm assembly 142 has a first end at 146 and a second end at 148. As noted, the upper shock linkage arm assembly is pivotally mounted at its first end, at 146, to the lower linkage arm 140; and it is pivotally mounted at 148 at its second end, at 148, to the single arm fork member 108. As also noted previously, the top end 132 of the linkage arm assembly 130 is included in the upper shock linkage arm assembly 142.

In general, the lower component 124 of the variable length shock absorber 120 is pivotally mounted at 132, substantially centrally of the upper shock linkage arm assembly—that is, at approximately the mid-point between its mounting points 146 and 148.

The variable length shock absorber 120 is spring biased by a coil spring (not shown) which is mounted internally within the shock absorber 120 so that, in the normal or rest position of the shock absorber 120, it is biased to its extended configuration and thus the swing arm assembly 112 is biased to its forward position as shown in each of FIGS. 5, 6A, and 7A. In general, the spring biasing means for the shock absorber 120 is a coil spring which is mounted between the upper component 122 and the lower component 124, within the shock absorber 120.

The pivotal motion of the swing arm assembly 112 about the swing arm pivot axis P, between the forward position as shown in FIGS. 5, 6A and 7A, and the trailing position as shown in FIGS. 6B and 7B, is such that the angular displacement of the swing arm assembly 112 is about 65°. In other words, the displaceable axis of rotation R will move arcuately about the swing arm pivot axis P through an angular displacement of about 65° from the positions shown in FIGS. 5, 6A, and 7A to the positions shown in FIGS. 6B and 7B.

Typically, the distance between the swing arm pivot axis P to the displaceable axis of rotation R—in other words, the functional length of the swing arm assembly—is between 5 centimeters and 15 centimeters; usually about 12 centimeters to 15 centimeters. Also, the displaceable axis of rotation R may be disposed forwardly of the steering axis, when the swing arm assembly is in its forward position, by a distance of about 5 centimeters to 10 centimeters; and it is disposed forwardly of the steering axis by about 2 centimeters to 5 centimeters when the swing arm assembly is in its trailing position. In any event, for purposes of stability, the displaceable axis of rotation R is always disposed forwardly of the steering axis S, no matter what position the swing arm assembly 132 will take.

Another analysis of the embodiment shown in FIGS. 5 through 7 is to consider the linkage arm assembly 130 as being a pivotally jointed linkage arm assembly having a top end at 148 pivotally mounted to the single arm fork member 108 for pivotal movement about the linkage arm upper axis L, and being pivotally mounted at it bottom end 134 to the swing arm assembly 112 for pivotal movement about the linkage arm lower axis—not shown, but generally, coincident with the displaceable axis of rotation R. The pivotally jointed linkage arm assembly 130 comprises the lower linkage arm 140 and the upper shock linkage arm assembly 142, which are pivotally connected one to the other at 146. The spring and damper shock absorbing means 120, comprising the upper portion 122 and lower portion 124 and an internally mounted spring (not shown), is operatively mounted between the single arm fork member 108 and the upper shock linkage arm assembly 142, and is connected thereto at 136 (which is coincident with 132), so as to bias the swing arm assembly 112 to its forward position.

The general orientation of the shock absorber 120 is usually such that it is substantially upright when the stability maintaining and shock absorbing bicycle front fork assembly 100 of the present invention is installed on a bicycle.

In general, a disk brake assembly (not shown) will be associated with the hub 114, with the rotor being securely attached to the hub 114. The callipers for the disk brake may be mounted at the mounting tab 160 located on the lower linkage arm 140. When the brakes are applied, there may be less tendency for the lower linkage arm 140 to swing about its axis of rotation, thereby stiffening the shock absorbing function of the stability maintaining and shock absorbing bicycle front fork assembly 100 of the present invention.

In use, the stability maintaining and shock absorbing bicycle front fork assembly 100 as described above with particular reference to FIGS. 5 through 7, will permit vertical travel of the displaceable axis of rotation R to the extent that the change in vertical distance between the displaceable axis of rotation R and a fixed point on the fixed assembly—say, for example, the upper or lower crown members 104 or 106—will be decreased by at least 15 centimeters. At that time, the swing arm assembly 112 is pivotally moved about the swing arm pivot axis P from the forward position as shown in FIGS. 6A and 7A to the trailing the position as shown in FIGS. 6B and 7B. It will be noted that the displaceable axis of rotation R is displaced rearwardly, so as to more closely approach—or be less forwardly spaced from—the steering axis S. The linkage arm assembly 130 changes its configuration, also as shown by an analysis of 6A and 7A relative to FIGS. 6B and 7B, respectively, and the shock absorber 120 has absorbed considerable forces so as to assume its compressed configuration as shown in FIGS. 6B and 7B. Thus, because the shock absorber 120 biases the displaceable axis of rotation R downwardly, the shock absorbing bicycle front fork assembly 100 of the present invention is capable of absorbing considerable force due to the impact of the bicycle wheel on the ground. However, having regard to FIGS. 1 through 3, any potential decrease in stability is compensated for by the movement of the swing arm assembly 112 so as to permit the displaceable axis of rotation R to approach the steering axis S, thereby decreasing the front fork projection x. Accordingly, as shown in FIG. 3, at arrow E, a decrease of the relative front projection x compensates for the increase in the head angle H (as shown in FIG. 1), thus essentially maintaining the stability of the bicycle—more or less; or, in other words, essentially precluding potential loss of stability of the bicycle. As previously noted, the pivotal movement of the swing arm assembly 112 may be such as to provide sufficient decrease in the relative front projection x so as to accommodate large decreases in the vertical distance between the displaceable axis of rotation R and a fixed point such as upper or lower crown members 104 or 106, respectively. Such large decreases can be in the order of 15 centimeters; and such decreases are accommodated as a consequence of the configuration of the linkage arm assembly 130.

Finally, the stability of a bicycle having the stability maintaining and shock absorbing bicycle front fork assembly 100 particularly as shown in FIGS. 5 through 7 will be maintained throughout movement of the swing are assembly 112 from its forward position to its trailing position. Such movement is also shown by curve G in FIGS. 8, as compared to a conventional telescopic front fork bicycle as shown by curve N in FIG. 8.

Other modifications and alterations may be used in the design and manufacture of the apparatus of the present invention without departing from the spirit and scope of the accompanying claims.

What is claimed is:

1. A stability maintaining and shock absorbing bicycle front fork assembly for mounting a front bicycle wheel on a bicycle for rotation of the front bicycle wheel about a displaceable axis of rotation, comprising:

a steering spindle for pivotal mounting on a front frame portion of a bicycle, said steering spindle defining a steering axis longitudinally thereof;

a top crown member and a bottom crown member each rigidly attached to said steering spindle for pivotal movement therewith;

a single arm fork member having a top end and a bottom end, and being rigidly attached adjacent its top end to said top and bottom crown members so as to depend therefrom;

a swing arm assembly pivotally mounted on said single arm fork member, for pivotal movement of said swing arm assembly about a swing arm pivot axis oriented generally parallel to said displaceable axis of rotation of said front bicycle wheel and generally perpendicular to said steering axis, and disposed forwardly of said steering axis;

hub means defining said displaceable axis of rotation for a front bicycle wheel, and disposed on said swing arm assembly so as to permit mounting of a front bicycle wheel thereon, whereby the front bicycle wheel can rotate about said displaceable axis of rotation;

wherein, when a front bicycle wheel is mounted on said hub means, said swing arm assembly is pivotally movable between a forward position whereat said displaceable axis of rotation is disposed forwardly of said steering axis and between said steering axis and said swing arm pivot axis, and a trailing position whereat the displaceable axis of rotation is disposed closer to said steering axis than when in said forward position, and is also displaced vertically closer to said swing arm pivot axis than when in said forward position;

variable length shock absorbing means comprising an upper component and a lower component, wherein said upper and lower components are slidably engaged one with the other for relative movement between an extended configuration and a compressed configuration, with said upper component securely mounted on said single arm fork member; and a linkage arm assembly having a top end and a bottom end, and being pivotally mounted at its bottom end to said swing arm assembly for pivotal movement about a linkage arm lower axis, and pivotally mounted at its top end to said lower component of said shock absorbing means for pivotal movement about a linkage arm upper axis, with said linkage arm upper and lower axes being substantially parallel to said displaceable axis of rotation;

wherein said linkage arm assembly comprises a lower linkage arm and an upper shock linkage arm assembly pivotally mounted one to the other, wherein said lower linkage arm includes said bottom end, and said upper shock linkage arm assembly has a first end and a second end;

wherein said upper shock linkage arm assembly is pivotally mounted at said first end to said lower linkage arm, and is pivotally mounted at said second end to said single arm fork member, and includes said top end; and wherein said variable length shock absorbing means is spring biased to said extended configuration so as to bias said swing arm assembly to its forward position.

2. The stability maintaining and shock absorbing bicycle front fork assembly of claim 1, wherein the pivotal motion of said swing arm assembly about said swing arm pivot axis between said forward position and said trailing position is through an angular displacement of about 65°.

3. The stability maintaining and shock absorbing bicycle front fork assembly of claim 1, wherein said displaceable axis of rotation is disposed forwardly of said steering axis when said swing arm assembly is in its trailing position.

4. The stability maintaining and shock absorbing bicycle front fork assembly of claim 1, wherein said variable length shock absorbing means is spring biased by means of a coil spring mounted between said upper component and said lower component of said variable length shock absorbing means.

5. The stability maintaining and shock absorbing bicycle front fork assembly of claim 1, wherein said swing arm assembly is mounted adjacent said bottom end of said single arm fork member.

6. The stability maintaining and shock absorbing bicycle front fork assembly of claim 5, wherein said swing arm assembly comprises left and right arm portions.

7. The stability maintaining and shock absorbing bicycle front fork assembly of claim 6, wherein said linkage arm upper and lower axes are substantially parallel to said displaceable axis of rotation.

8. The stability maintaining and shock absorbing bicycle front fork assembly of claim 7, wherein said linkage arm lower axis and said displaceable axis of rotation are coincident one with the other.

9. The stability maintaining and shock absorbing bicycle front fork assembly of claim 8, wherein said lower component of said variable length shock absorbing means is pivotally mounted substantially centrally on said upper shock linkage arm assembly.

10. The stability maintaining and shock absorbing bicycle front fork assembly of claim 9, wherein said upper shock linkage arm assembly comprises left and right arm portions.

11. The stability maintaining and shock absorbing bicycle front fork assembly of claim 4, wherein said single arm fork member comprises an upper portion and a forwardly bowed lower portion united at a common junction, wherein a rearwardly directed mounting tab is disposed adjacent said common junction, and wherein said spring and damper shock absorbing means is pivotally mounted at its top end at said rearwardly directed mounting tab.

12. The stability maintaining and shock absorbing bicycle front fork assembly of claim 1, wherein said top crown member and said bottom crown member are each rigidly attached in removable and replaceable relation to said steering spindle.

13. A stability maintaining and shock absorbing bicycle front fork assembly for mounting a front bicycle wheel on a bicycle for rotation of the front bicycle wheel about a displaceable axis of rotation, comprising:

a steering spindle for pivotal mounting on a front frame portion of a bicycle, said steering spindle defining a steering axis longitudinally thereof;

a top crown member and a bottom crown member each rigidly attached to said steering spindle for pivotal movement therewith;

a single arm fork member having a top end and a bottom end, and being rigidly attached adjacent its top end to said top and bottom crown members so as to depend therefrom;

a swing arm assembly mounted on said single arm fork member to define a swing arm pivot axis oriented generally parallel to said displaceable axis of rotation, for pivotal movement of said swing arm assembly between a forward position, whereat said swing arm assembly extends downwardly and rearwardly from said swing arm pivot axis and wherein said displaceable axis of rotation is disposed forwardly of said steering axis and rearwardly of said swing arm pivot axis, and a trailing position whereat said displaceable axis of rotation is disposed closer to said steering axis than when in said forward position;

hub means defining said displaceable axis of rotation for a front bicycle wheel, and disposed on said swing arm assembly so as to permit mounting of a front bicycle wheel thereon, whereby the front bicycle wheel can rotate about said displaceable axis of rotation;

a pivotally jointed linkage arm assembly having a top end pivotally mounted to said single arm fork member for pivotal movement about a linkage arm upper axis and a bottom end pivotally mounted to said swing arm assembly for pivotal movement about a linkage arm lower axis, said pivotally jointed linkage arm assembly comprising a lower linkage arm and an upper shock linkage arm assembly pivotally connected one to the other;

spring and damper shock absorbing means operatively mounted between said single arm fork member and said upper shock linkage arm assembly so as to bias said swing arm assembly to its forward position.

14. The stability maintaining and shock absorbing bicycle front fork assembly of claim 13, wherein said swing arm assembly is mounted adjacent said bottom end of said single arm fork member.

15. The stability maintaining and shock absorbing bicycle front fork assembly of claim 14, wherein said linkage arm upper and lower axes are substantially parallel to said displaceable axis of rotation.

16. The stability maintaining and shock absorbing bicycle front fork assembly of claim 15, wherein said linkage arm lower axis and said displaceable axis of rotation are coincident one with the other.

17. The stability maintaining and shock absorbing bicycle front fork assembly of claim 16, wherein said spring and damper shock absorbing means has a top end and a bottom end, and is pivotally mounted at said top end to said single arm fork member, and is pivotally mounted at said bottom end to said upper shock linkage arm assembly.

18. The stability maintaining and shock absorbing bicycle front fork assembly of claim 14, wherein said spring and damper shock absorbing means is oriented substantially upright.

19. The stability maintaining and shock absorbing bicycle front fork assembly of claim 14, wherein said spring and damper shock absorbing means is pivotally mounted at its bottom end, as aforesaid, substantially centrally on said upper shock linkage arm assembly.

20. The stability maintaining and shock absorbing bicycle front fork assembly of claim 19, wherein said upper shock linkage arm assembly comprises left and right arm portions.

21. The stability maintaining and shock absorbing bicycle front fork assembly of claim 14, wherein said single arm fork member comprises an upper portion and a forwardly bowed lower portion united at a common junction, wherein a rearwardly directed mounting tab is disposed adjacent said common junction, and wherein said spring and damper shock absorbing means is pivotally mounted at its top end at said rearwardly prominent mounting tab.

22. The stability maintaining and shock absorbing bicycle front fork assembly of claim 14, wherein said top crown member and said bottom crown member are each rigidly attached in removable and replaceable relation to said steering spindle.

23. The stability maintaining and shock absorbing bicycle front fork assembly of claim 14, wherein the pivotal motion of said swing arm assembly about said swing arm pivot axis between said forward position and said trailing position is through an angular displacement of about 65°.

24. The stability maintaining and shock absorbing bicycle front fork assembly of claim 13, wherein said displaceable axis of rotation is disposed forwardly of said steering axis when said swing arm assembly is in its trailing position.

* * * * *